(12) United States Patent
Lutz et al.

(10) Patent No.: US 7,668,892 B2
(45) Date of Patent: Feb. 23, 2010

(54) DATA PROCESSING APPARATUS AND METHOD FOR NORMALIZING A DATA VALUE

(75) Inventors: David Raymond Lutz, Austin, TX (US); Christopher Neal Hinds, Landbeach (GB)

(73) Assignee: ARM Limited, Cambridge (GB)

( * ) Notice: Subject to any disclaimer, the term of this patent is extended or adjusted under 35 U.S.C. 154(b) by 929 days.

(21) Appl. No.: 11/211,087

(22) Filed: Aug. 25, 2005

(65) Prior Publication Data

US 2007/0050434 A1    Mar. 1, 2007

(51) Int. Cl.
G06F 15/00  (2006.01)
G06F 7/42   (2006.01)
(52) U.S. Cl. ..................................... 708/205; 708/505
(58) Field of Classification Search ................. 708/205, 708/211, 505
See application file for complete search history.

(56) References Cited

U.S. PATENT DOCUMENTS

| | | | |
|---|---|---|---|
| 5,771,183 A * | 6/1998 | Makineni | 708/205 |
| 6,085,211 A | 7/2000 | Yoshioka | |
| 6,499,044 B1 * | 12/2002 | Brooks et al. | 708/211 |
| 6,757,812 B1 * | 6/2004 | Green et al. | 712/222 |
| 2002/0165887 A1 | 11/2002 | Rogenmoser et al. | |

OTHER PUBLICATIONS

H. Suzuki et al, "Leading-Zero Anticipatory Logic for High-Speed Floating Point Addition" *IEEE Journal of Solid-State Circuits*, vol. 31, No. 8, Aug. 1996, pp. 1157-1164.
M. Schmookler et al, "Leading Zero Anticipation and Detection—A Comparison of Methods" Proceedings of the 15*th* IEEE Symposium on Computer Arithmetic, 2001.
J. D. Bruguera et al, "Leading-One Prediction with Concurrent Position Correction" *IEEE Transactions on Computers*, vol. 48, No. 10, Oct. 1999, pp. 1083-1097.
E. Hokenek et al, "Leading-Zero Anticipator (LZA) in the IBM RISC System/6000 Floating-Point Execution Unit" *IBM Journal of Res. and Dev.*, vol. 34, No. 1, 1990, pp. 71-77.
H. Quach et al, "Leading One Prediction—Implementation, Generalization, and Application" Technical Report: CSL-TR-91-463; Mar. 1991, pp. 1-12.

* cited by examiner

*Primary Examiner*—Chuong D Ngo
(74) *Attorney, Agent, or Firm*—Nixon & Vanderhye P.C.

(57) ABSTRACT

A data processing apparatus and method are provided for normalizing a data value to produce a result value. The data processing apparatus includes prediction logic for generating a shift indication based on a prediction of the number of bit positions by which the data value needs to be shifted in order to normalize the data value. Further, normalizer logic is used to apply a shift operation to the data value based on the shift indication. In addition, correction logic is operable in parallel with the normalizer logic to determine from the data value and a least significant bit of the shift indication whether the shift indication has correctly predicted the number of bit positions by which the data value needs to be shifted in order to normalize the data value, or whether instead the prediction is incorrect, and to generate an output signal dependent on that determination. Shift logic is then used, if the output signal indicates that the prediction is incorrect, to apply a correction shift such that the result value is the normalized data value.

10 Claims, 8 Drawing Sheets

FIG. 8 ue as shown in FIG. 1).

DATA PROCESSING APPARATUS AND METHOD FOR NORMALIZING A DATA VALUE

BACKGROUND OF THE INVENTION

1. Field of the Invention

The present invention relates to a data processing apparatus and method for normalizing a data value.

2. Description of the Prior Art

Within a data processing apparatus, it is often the case that a data value may need to be normalized, such normalization requiring the data value to be shifted by a number of bit positions to cause the leading 1 of the data value to be placed in the integer bit position, i.e. immediately to the left of the position at which the decimal point is considered to exist in the data value. A particular example where such normalization is often used is in the processing of floating point numbers.

A floating point number can be expressed as follows:

$$\pm 1.x * 2^y$$

where: x=fraction
1.x=significand (also known as the mantissa)
y=exponent

Figure 1:
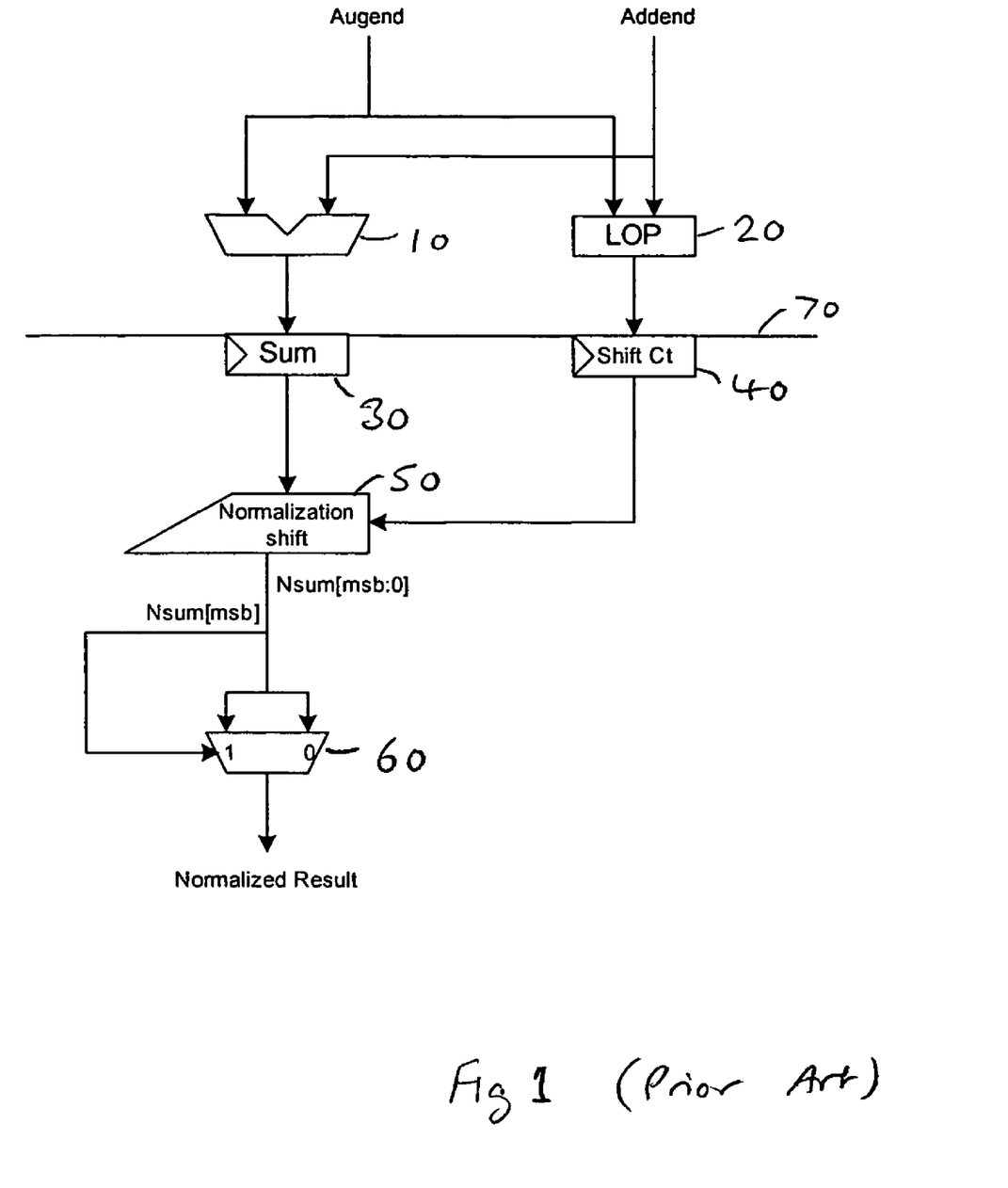
FIG. 1 is a diagram of a data processing apparatus in accordance with one known prior art technique.

FIG. 1 is a diagram illustrating a known prior art technique for normalizing a data value, in this case a sum value output by the adder logic 10. In particular, the adder logic 10 is arranged to receive the significands of two floating point numbers to be added, referred to in FIG. 1 as the augend and the addend, and the resultant sum value is stored in the register 30.

In parallel with the addition performed by the adder logic 10, leading one prediction logic 20 (which can in alternative embodiments be replaced by leading zero anticipator logic) is used to predict the bit position of the most significant 1 in the sum, this being done on the basis of the input augend and addend. The leading one prediction logic 20 then outputs a shift count value indicating a predicted number of bit positions by which the sum value should be shifted in order to produce a normalized sum (i.e. a sum of the form 1.x). Considering as an example single precision floating point numbers, the input significands will be 24 bits in length, and in such embodiments the sum output by adder 10 will be 25 bits in length, and the shift count value output by the leading one prediction logic will be 5 bits.

The functions performed by the adder logic 10 and leading one prediction logic 20 will typically be implemented within a particular pipeline stage of a data processing apparatus, and at the end of that pipeline stage, the sum value produced by the adder logic 10 will be stored in the register 30 and the shift count value produced by the leading one prediction logic 20 will be stored in the register 40. The end of this pipeline stage is indicated by the horizontal line 70 in FIG. 1.

In the next pipeline stage, the sum value is output from the register 30 to normalization shift logic 50, which is arranged to perform a left shift of the sum value by a number of bit positions indicated by the shift count value read from the register 40. Assuming the input significands to the add operation are n bits in length, the sum value output by the adder logic 10 will be n+1 bits in length, as will the shifted sum value output by the normalization shift logic 50. Bits n to 1 are routed to a first input of multiplexer 60 (the left-hand side input as shown in FIG. 1), and bits n−1 to 0 are input to a second input of the multiplexer 60 (the right-hand side input as shown in FIG. 1).

The final required normalized result will be n bits in length, and if the shift count predicted by the leading one prediction logic 20 was correct, then the most significant bit output from the normalization shift logic 50 will be a logic zero value, and the correct normalized result will be given by bits n−1 to 0, i.e. the right-hand side input to multiplexer 60. However, it is possible that the shift count produced by the leading one prediction logic 20 may be one greater than required. This is due to the fact that the leading one prediction logic 20 predicts the shift count by evaluating the two input operands from left to right until a leading one candidate is found. If a carry exists into that bit position, the shift count predicted by the leading one prediction logic 20 will be one greater than required. This is detected by looking at the most significant bit of the output from the normalization shift logic 50. If the most significant bit is set, then the prediction performed by the leading one prediction logic 20 was incorrect and a single right shift is required to produce the correctly normalized result. This single right shift is effected by driving the multiplexer 60 to select as its output the left-hand side input, i.e. bits n to 1, to form the output n-bit normalized sum. Otherwise, if the most significant bit output by the normalization shift logic 50 is a logic 0 value, then the prediction performed by the leading one prediction logic 20 was correct, and the multiplexer 60 is driven to select as its output the right-hand side input, i.e. bits n−1 to 0 output by the normalization shift logic 50.

It should be noted from FIG. 1 that the output of the normalization shift logic 50 is used to drive the final multiplexer 60, creating a timing arc from the output of the normalization shift logic 50 through the mux control to the final normalized result. Hence, whilst the detection of an error in the leading 1 prediction is trivial, such detection must be buffered in order to drive the final multiplexer and such buffering and muxing time are added to the normalization time, which can result in an unacceptable delay in the generation of the normalized result.

An example of the technique illustrated in FIG. 1 can be seen in Suzuki et al., "Leading-Zero Anticipatory Logic for High-Speed Floating Point Addition" IEEE J. Solid State Circuits, Vol 31, No. 8, August 1996. A general survey of leading one and zero anticipation methods is the subject of Schmookler et al., "Leading Zero Anticipation and Detection—A Comparison of Methods" 15th Symposium on Computer Arithmetic, pp 7-12.

Figure 2:
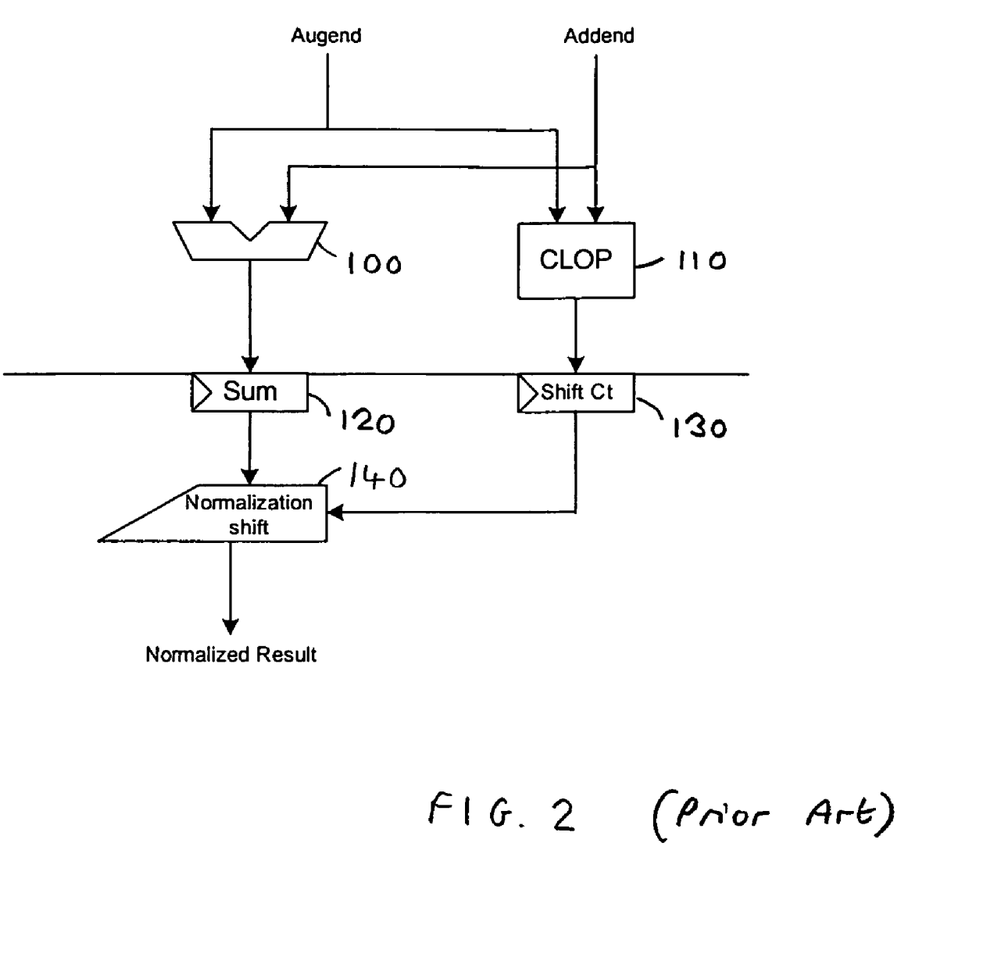
FIG. 2 is a diagram of a data processing apparatus in accordance with a second known prior art technique.

Recently, work has been done to seek to reduce the above timing problems associated with the prior art technique of FIG. 1. In accordance with the technique described in the article "Leading-One Prediction with Concurrent Position Correction" by Bruguera and Lang, IEEE Transactions on Computers, Vol 48, No. 10, October 1999, pp 1083-1097, a modified leading one predictor is described which, based on the input operands, is able to return either a corrected shift count or a signal indicating an error in the prediction. Such an approach is schematically illustrated in FIG. 2. As can be seen in FIG. 2, which illustrates another means of adding two significands, an adder 100 is used to produce a sum stored in register 120. In parallel, the modified leading one prediction logic 110 described in the above article is used to produce a shift count value for storing in the register 130, which can be ensured to be correct, due to the additional logic provided within the leading one prediction logic 110, which is referred to in FIG. 2 as CLOP (correction leading one prediction) logic 110. Since the output from the CLOP circuit 110 will be correct, it is only necessary in the subsequent pipeline stage to employ normalization shift logic 140 to shift the output from the adder 100 by a number of bit positions indicated by the shift count value stored in the register 130, with the output from the normalization shift logic 140 then being guaranteed to be the correct normalized result.

Whilst such an approach enables the removal of a final multiplexer after the normalization shift logic 50, it introduces a significant amount of extra logic to the leading one prediction, which makes its implementation very costly. In implementations where cost is a significant factor, and needs to be balanced against performance, it is likely that the additional cost involved in such an approach will be prohibitive.

Figure 3:
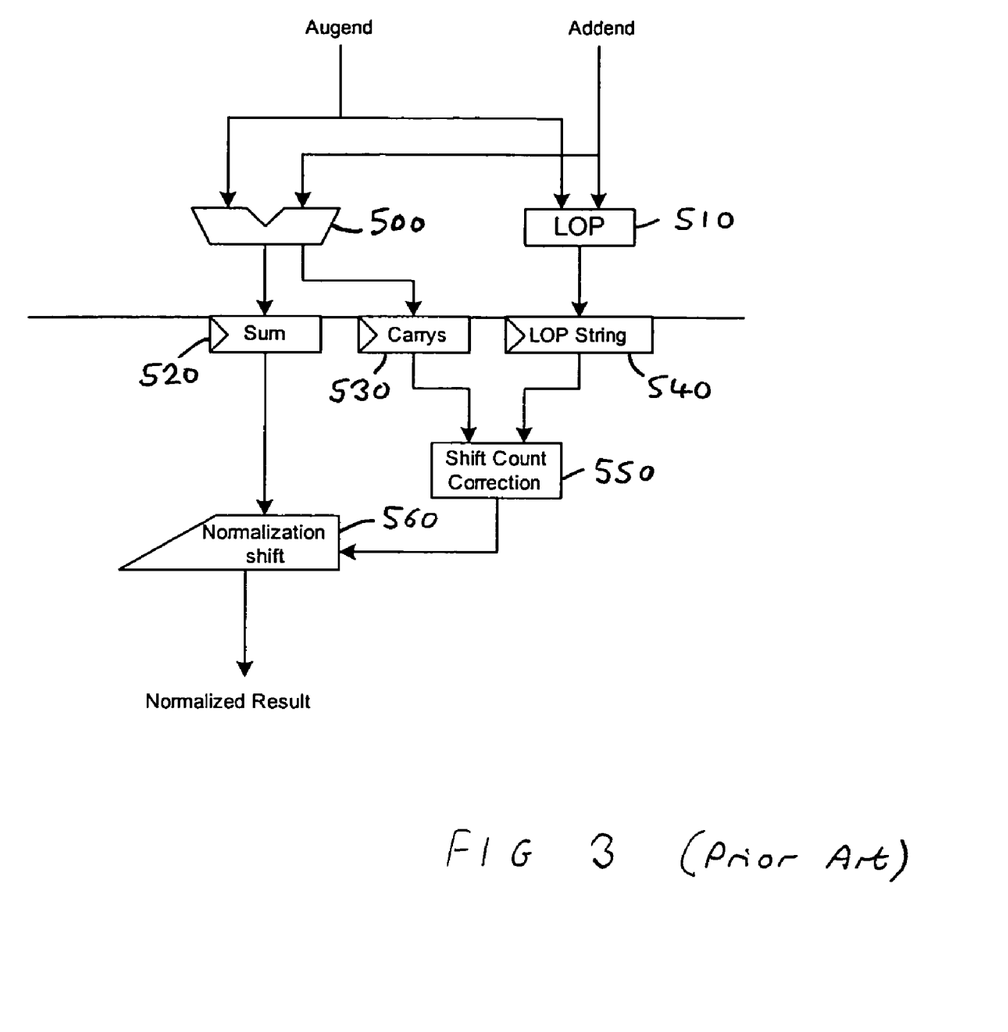
FIG. 3 is a diagram of a data processing apparatus in accordance with a third known prior art technique.

An alternative prior art approach aimed at seeking to reduce the timing problems associated with the prior art of FIG. 1 involves using standard leading one prediction logic to produce a predicted shift count, and then providing correction logic to perform any required correction in parallel with the shift operation performed by the normalization shift logic. In particular, in accordance with the technique described in Hokenek et al., "Leading-Zero anticipator (LZA) in the IBM RISC System/6000 Floating-point execution unit" IBM J. Res. Develop. 34:71-77 (1990), and in Quach et al, "Leading One Prediction—Implementation, Generalization and Application", Technical Report CSL-TR-91-463, Stanford Univ., 1991, and in U.S. Pat. No. 6,085,211, the output of the leading one predictor is modified with carry information from the adder to generate a correct prediction. This technique is schematically illustrated in FIG. 3. As can be seen in FIG. 3, which illustrates logic used to add two significands, adder 500 is used to produce a sum based on two input significands provided as the augend and addend, the sum being stored in register 520. The adder 500 also outputs a second value representing at each bit position in the sum the carry into that bit position, which is stored in register 530. In parallel, the leading one predictor 510 generates a prediction value representing the location of the bit position containing the predicted leading one bit, this prediction value being stored in register 540. This prediction may be incorrect by one bit position if the carry into that bit position, given by the carry output from adder 500, is set. The shift count correction logic 550 combines the prediction value of the leading one predictor 510 and the carry vector from adder 500 and generates a correct shift count value input to normalization shift logic 560. However, the extraction of the carry signals complicates the adder design, both in routing and timing. Hence, although this technique avoids the need to await the output from the normalization shift logic before deciding how to drive a final correction multiplexer, it significantly complicates the overall design.

US 2002/0165887A1 describes an alternative approach in which a leading one correction circuit is used to determine whether a final correction shift is required in order to correct for a 1-bit error in the shift count identified by the leading one prediction logic. In accordance with this technique, the leading one correction circuit receives both the sum produced by the adder logic, and a 1-hot vector produced by the leading one prediction logic, the 1-hot vector having a bit set to represent the predicted location of the leading one, the prediction being correct if the true leading one in the sum is in this location, and being incorrect if the true leading one in the sum is in the bit location immediately to the right of the predicted location. This 1-hot vector value is shifted left by one bit position and logically ANDed with the sum from the adder, and if the value resulting from the AND operation is one, the leading one prediction is determined to be incorrect and a correction step is required.

Whilst such an approach can avoid the need to wait for the output of the normalization shift logic to be produced before determining whether a correction shift is required, it requires modification of the leading one prediction logic to ensure that leading one prediction logic produces not only the shift count value, but also the required 1-hot vector used by the leading one correction circuit. This 1-hot vector will be the width of the sum produced by the adder, and accordingly would be 24-bits in length for single precision floating point numbers and 53-bits in length for double precision floating point numbers. Hence, this increases the complexity of the leading one prediction logic. In addition, thereafter, the 1-hot prediction vector (left shifted by one bit position) and the sum from the adder are bit-wise ANDed and the outputs input to a reduction OR function. If the result is high, the prediction of the leading one prediction logic is incorrect and must be corrected. Hence, in summary, it can be seen that this technique also adds a significant amount of complexity to the design, which will increase the cost.

Accordingly, it would be desirable to provide an improved technique for normalizing a data value which allows a timing improvement to be achieved with respect to the earlier-described prior art of FIG. 1, but which is less complex than the known techniques.

SUMMARY OF THE INVENTION

Viewed from a first aspect, the present invention provides a data processing apparatus for normalizing a data value to produce a result value, comprising: prediction logic operable to generate a shift indication based on a prediction of the number of bit positions by which the data value needs to be shifted in order to normalize the data value; normalizer logic operable to apply a shift operation to the data value based on the shift indication; correction logic operable in parallel with the normalizer logic to determine from the data value and a least significant bit of the shift indication whether the shift indication has correctly predicted the number of bit positions by which the data value needs to be shifted in order to normalize the data value, or whether instead the prediction is incorrect, and to generate an output signal dependent on that determination; and shift logic operable if the output signal indicates that the prediction is incorrect to apply a correction shift such that the result value is the normalized data value.

In accordance with the present invention correction logic is provided which is able to determine from the data value requiring normalization, and a least significant bit of the shift indication produced by prediction logic, whether that shift indication has correctly predicted the number of bit positions by which the data value needs to be shifted in order to normalise it. Shift logic can then be driven based on the determination made by the correction logic such that if the prediction is determined to be incorrect, a correction shift can be applied by the shift logic. Since the correction logic only requires the least significant bit of the shift indication produced by the prediction logic, there is no need to adapt the prediction logic, such as for example is required in accordance with the teaching of US 2002/0165887A1. Further, since the other input to the correction logic is the data value to be normalized, there is no need to provide any additional circuitry to extract other information pertaining to the data value, as for example was required by the teaching of Hokenek et al, Quach et al, and U.S. Pat. No. 6,085,211, where in accordance with that teaching additional complexity was required in order to extract carry signals associated with each bit position of the data value.

Accordingly, the present invention enables a significant timing improvement to be achieved with respect to the earlier-described prior art of FIG. 1, since there is no requirement to await the output from the normalization shift logic before determining whether any correction is required, and additionally the technique of the present invention avoids the complexities associated with the earlier described prior art techniques aimed at providing improved timing.

The shift logic used to apply the correction shift can be implemented in a variety of ways. However, in one embodiment, the shift logic is incorporated within the normalizer logic, which provides a particularly efficient implementation.

In one particular embodiment, the normalizer logic comprises a sequence of shifter stages, and the shift logic is incorporated within a final shifter stage of the normalizer logic. Hence, in accordance with such embodiments, the correction logic can operate in parallel with the normalizer logic, and only needs to produce its output signal in time for it to be routed to the final shifter stage of the normalizer logic.

In one embodiment where the shift logic is incorporated within the normalizer logic, the correction logic further comprises output signal generation logic which, when generating the output signal dependent on the determination as to whether the prediction is correct or incorrect, also takes into account any normal shift required to be performed by the normalizer logic based on the least significant bit of the shift indication. Hence, in such embodiments, there is no requirement for the normalizer logic itself to receive the least significant bit of the shift indication, since all of the required evaluation of the least significant bit of the shift indication can be performed within the correction logic so as to encode within the output signal an appropriate shift to be performed by the normalizer logic, based both on the actual shift indicated by the least significant bit of the shift indication, and an indication as to whether the prediction performed by the prediction logic was correct or incorrect.

The correction logic may evaluate the data value in a variety of ways. However, in one embodiment, the correction logic is operable to determine from the data value whether the leading one in that data value is at an even bit position or an odd bit position, and then to determine with reference to the least significant bit of the shift indication whether application of the shift operation based solely on the shift indication will cause the data value to be normalized.

The prediction logic of embodiments of the present invention may be implemented by standard leading one prediction logic or standard leading zero anticipator logic. As discussed earlier, such prediction logic will produce a shift indication which is either correct, or incorrect by one bit. This maximum error of one bit means that the correctness of the shift indication produced by the prediction logic can be evaluated based solely on the knowledge of whether the leading one in the data value to be normalized is at an even bit position or an odd bit position, in combination with the knowledge of the value of the least significant bit of the shift indication. Hence, this provides a particularly efficient implementation of the correction logic.

In one embodiment, if the leading one of the data value is at an even bit position, and the least significant bit of the shift indication is 0, then the correction logic determines that application of the shift operation based solely on the shift indication will not cause the data value to be normalized, and accordingly the output signal indicates that the prediction is incorrect. For the purposes of the present description, if an n-bit data value is expressed by bits n−1 to 0, then the even bit positions are bits 0, 2, 4, . . . , and the odd bit positions are bits 1, 3, 5, . . . If the leading one of the data value is at an even bit position, and the least significant bit of the shift indication is zero, indicating a shift by an even number of bits, then it is clear that such a shift will not place the leading one in the bit position n−1 as is required by a correctly normalized sum, and accordingly this will indicate that the prediction is incorrect.

As an alternative to the above approach, the correction logic can be arranged such that, if the leading one of the data value is at an odd bit position, and the least significant bit of the shift indication is 1, then the correction logic determines that application of the shift operation based solely on the shift indication will not cause the data value to be normalized, and accordingly the output signal indicates that the prediction is incorrect. Again, if the leading one of the data value is at an odd bit position, and the least significant bit of the shift indication is 1, hence indicating a shift by an odd number of bit positions, it is clear that the resultant leading one will not be in bit position n−1 as required by a correctly normalized sum, and hence again this will indicate that the prediction is incorrect.

In one embodiment, the correction shift applied by the shift logic if the prediction is incorrect is a one bit right shift.

The data value to be normalized may take a variety of forms. However, in one embodiment, the data value is a significand of a floating point data value, the data processing apparatus further comprising: data processing logic operable to generate the significand from one or more input operands; the prediction logic being operable to generate the shift indication based on an evaluation of the one or more input operands. Hence, in such embodiments, the data processing logic performs some processing operation on the input operands in order to produce the significand value to be normalised, and the prediction logic generates the shift indication based on the input operands.

The data processing logic can take a variety of forms. However, in one embodiment, the data processing logic is operable to perform an unlike signed addition of first and second input operands. When performing unlike signed addition of two floating point operands, it is possible for the upper bits to cancel to a significant extent, and hence in such scenarios it is likely that a normalization will be required.

Viewed from a second aspect, the present invention provides a method of operating a data processing apparatus to normalize a data value to produce a result value, comprising the steps of: (i) generating a shift indication based on a prediction of the number of bit positions by which the data value needs to be shifted in order to normalize the data value; (ii) applying a shift operation to the data value based on the shift indication; (iii) in parallel with said step (ii), determining from the data value and a least significant bit of the shift indication whether the shift indication has correctly predicted the number of bit positions by which the data value needs to be shifted in order to normalize the data value, or whether instead the prediction is incorrect, and generating an output signal dependent on that determination; and (iv) if the output signal indicates that the prediction is incorrect, applying a correction shift such that the result value is the normalized data value.

BRIEF DESCRIPTION OF THE DRAWINGS

The present invention will be described further, by way of example only, with reference to an embodiment thereof as illustrated in the accompanying drawings, in which.

DESCRIPTION OF AN EMBODIMENT

Figure 4:
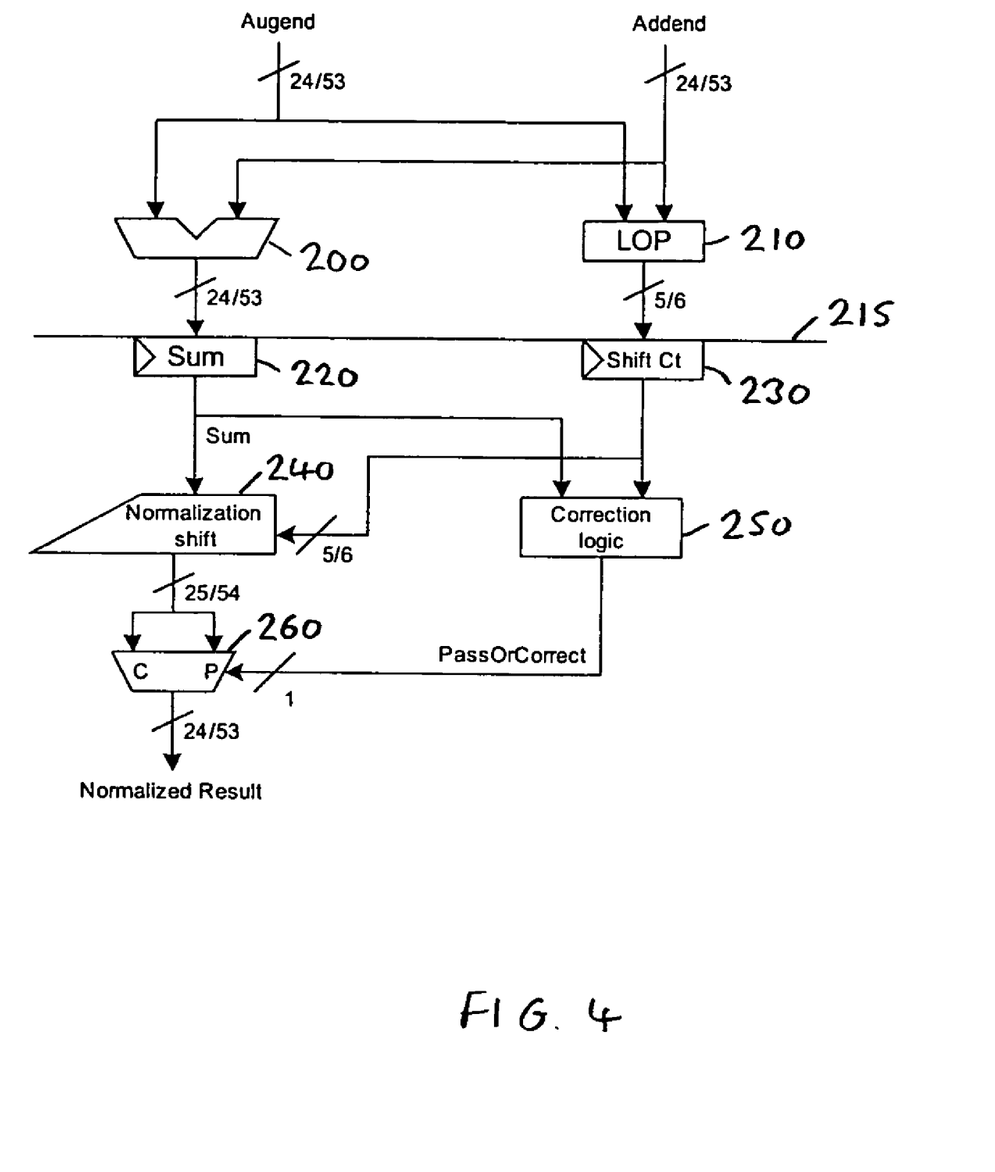
FIG. 4 is a block diagram of a data processing apparatus in accordance with one embodiment of the present invention.

FIG. 4 is a block diagram of a data processing apparatus in accordance with one embodiment of the present invention, this apparatus being used to add first and second n-bit significands of two floating point operands in order to produce an n-bit normalized result. If for the sake of illustration, it is assumed that the input operands are single precision floating point operands, each operand will consist of a 1-bit sign value, an 8-bit exponent value and 23-bit fraction value. The 23-bit fraction value will be converted into a 24-bit significand and the 24-bit significands from both floating point operands are input to the apparatus of FIG. 4 as the augend and addend, respectively. For double precision floating point operands the significands will be 53 bits in length.

Within a data processing apparatus, it is known to adopt two split data paths for performing floating point additions, referred to as the far path and the near path. The near path is used for unlike signed additions (USAs) with equal exponents or exponents differing by one and significands guaranteed to differ by less than one. The far path handles all other additions. In the near path, no rounding of the result will be required but normalization may be required due to massive cancellation. Such normalization logic is not required in the far path. However, in the far path it is necessary to provide logic to account for rounding due to the fact that the input significands may need more than a 1-bit alignment. Through the use of the near and far paths, the pipeline depth of the pipeline required to perform addition can be reduced, since one path requires normalization whilst the other does not, and one path requires rounding whilst the other does not. The logic shown in FIG. 4 is the part of the data processing apparatus employed in the near path to handle USA operations.

In floating point addition of unlike signed values it is possible for the upper bits to cancel. For example, consider the subtraction of the following two operands:

1.110110
1.110011 −
$\overline{0.000011}$

The result is not normalized. For floating point results the leading one must be in the integer position, i.e. in the bit position immediately to the left of the decimal point, and within the near path logic it is necessary to provide suitable logic to shift the sum to the left by the required number of bit positions in order to place the leading one in the integer position. When performing such a shift, logic is also provided in the exponent path to adjust the exponent accordingly. For clarity, the exponent path is omitted in FIG. 4.

The first stage of the near path adder logic shown in FIG. 4 is analogous to that discussed earlier with reference to FIG. 1, and accordingly an adder 200 is used to perform an unlike signed addition of the augend and the addend in order to produce a sum value for storage in the register 220. Given that the adder is performing an unlike signed addition, the addend will have been inverted prior to receipt by the adder logic 200, and the adder logic 200 will receive a carry-in value set to one (not shown in FIG. 4). Meanwhile, the leading one prediction circuit 210 will receive the augend and the inverted addend and will generate a shift count prediction based on an evaluation of the two input operands from left to right until a leading one candidate is found. As shown in FIG. 4, for single precision floating point operands, the significands will be 24 bits in length, and the predicted shift count value produced by the leading one prediction logic 210 will be 5 bits in length, whilst for double precision floating point operands, the significands will be 53 bits in length, and the shift count produced by the leading one prediction logic 210 will be 6 bits in length. The output produced by the adder 200 will be one bit wider than the input operands to allow for a like signed addition (LSA) computation which may result in a significand in the range [2.0, 4.0) (the symbol "[" signifies that the range includes 2.0, whilst the symbol ")" signifies that the range is up to but not including 4.0). For USA computations, only the lower 24 bits for single precision operations, and the lower 53 bits for double precision operations, are required.

In the second stage of the pipeline (i.e. that part of the pipeline below line 215 in FIG. 4), the sum value stored in the register 220 is input to the normalization shift logic 240, which performs a left shift of the sum value based on the predicted shift count value stored in the register 230. This results in a n+1 bit result being output from the normalization shift logic 240. Bits n to 1 are routed to the left-hand input of the multiplexer 260, whilst bits n−1 to 0 are routed to the right-hand input of the multiplexer 260. The multiplexer 260 can be considered analogous to the multiplexer 60 of FIG. 1. However, in contrast to the multiplexer 60 of FIG. 1, the multiplexer 260 does not receive its control signal based on the output from the normalization shift logic, and instead receives its control signal from correction logic 250 which operates in parallel with the normalization shift logic 240.

The correction logic 250 is arranged to receive the sum value from the register 220, and also to receive the least significant bit of the shift count value stored in the register 230. Within the correction logic 250, the sum value is evaluated to determine whether the leading one is in an odd or an even bit position. Based on this information, and the least significant bit of the shift count value produced by the leading one prediction logic 210, the correction logic can then determine whether the predicted shift count will produce a correctly normalized result, or will produce a result which has been shifted by one bit position more than required, and based on this an output signal can be sent from the correction logic 250 to control the multiplexer 260. In particular, if it is determined that the prediction is correct, a pass signal can be output from the correction logic 250 to cause the right-hand input of the multiplexer 260 to be output as the normalized result, whereas if it is determined that the prediction is incorrect, a correct signal can be output from the correction logic 250 to cause the left-hand input of the multiplexer 260 to be selected as the normalized result.

As will be discussed further with reference to FIGS. 5 to 8, the multiplexer 260 can be provided as a separate multiplexer connected to the output of the normalization shift logic 240, or alternatively can be provided within the final shift stage of the normalization shift logic 240.

Figure 5:
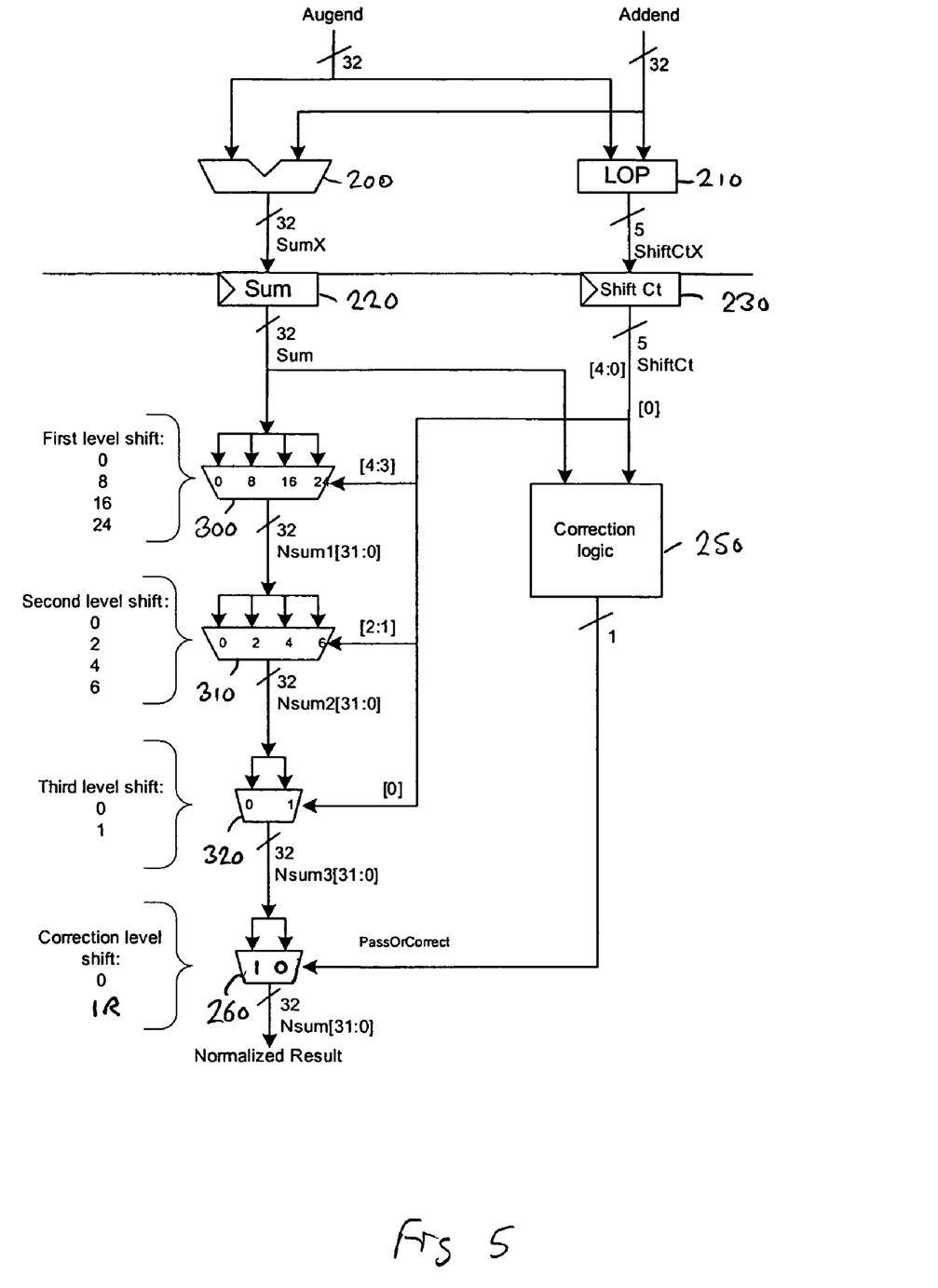
FIG. 5 is a block diagram illustrating in more detail the data processing apparatus of FIG. 4 in accordance with one embodiment of the present invention.

FIG. 5 is a block diagram illustrating in more detail the logic of FIG. 4 in an embodiment where the final multiplexer 260 is provided separately to the normalization shift logic 240. For the purposes of the embodiment of FIG. 5, it is assumed that the addition is being performed based on input single precision floating point operands. Although this means that the significands will only be 24-bits in length, the augend and addend are shown in FIG. 5 as 32-bit values, since it is often the case that the logic provided to perform USA computations is also used to perform other operations, in particular to perform a conversion operation of a 32-bit integer value into a floating point value. Accordingly, as shown in FIG. 5, the input values are extended to 32-bit values.

As shown in FIG. 5, the normalization shift logic 240 consists of a sequence of multiplexers 300, 310, 320. The first multiplexer 300 takes bits 4 and 3 of the predicted shift count and based thereon performs a left shift of 0, 8, 16 or 24 bit positions. The output from the multiplexer 300 is then routed to the multiplexer 310, which based on bits 2 and 1 of the predicted shift count performs a second level left shift of either 0, 2, 4 or 6 bit positions. Finally, the multiplexer 320 receives the least significant bit of the shift count and performs a third level left shift of either 0 or 1 bit positions, dependent on the value of the least significant bit.

The output from the multiplexer 320 is then routed to the multiplexer 260 discussed earlier with reference to FIG. 4. In accordance with this embodiment, the correction logic 250 outputs a logic zero signal if it determines that the predicted shift count is correct, and outputs a logic one value if it determines that the predicted shift count is incorrect, so as to cause an appropriate control of the multiplexer 260 to output the normalized result value. Given the need for the logic of FIG. 5 to also support conversion of a 32-bit integer value to a single precision floating point operand, the output from the multiplexer 260 will actually be a 32-bit value, but the 24-bit significand can readily be obtained from that 32-bit value by merely selecting the representative 24 bits for the single precision result from the computed 32 bits.

Figure 6:
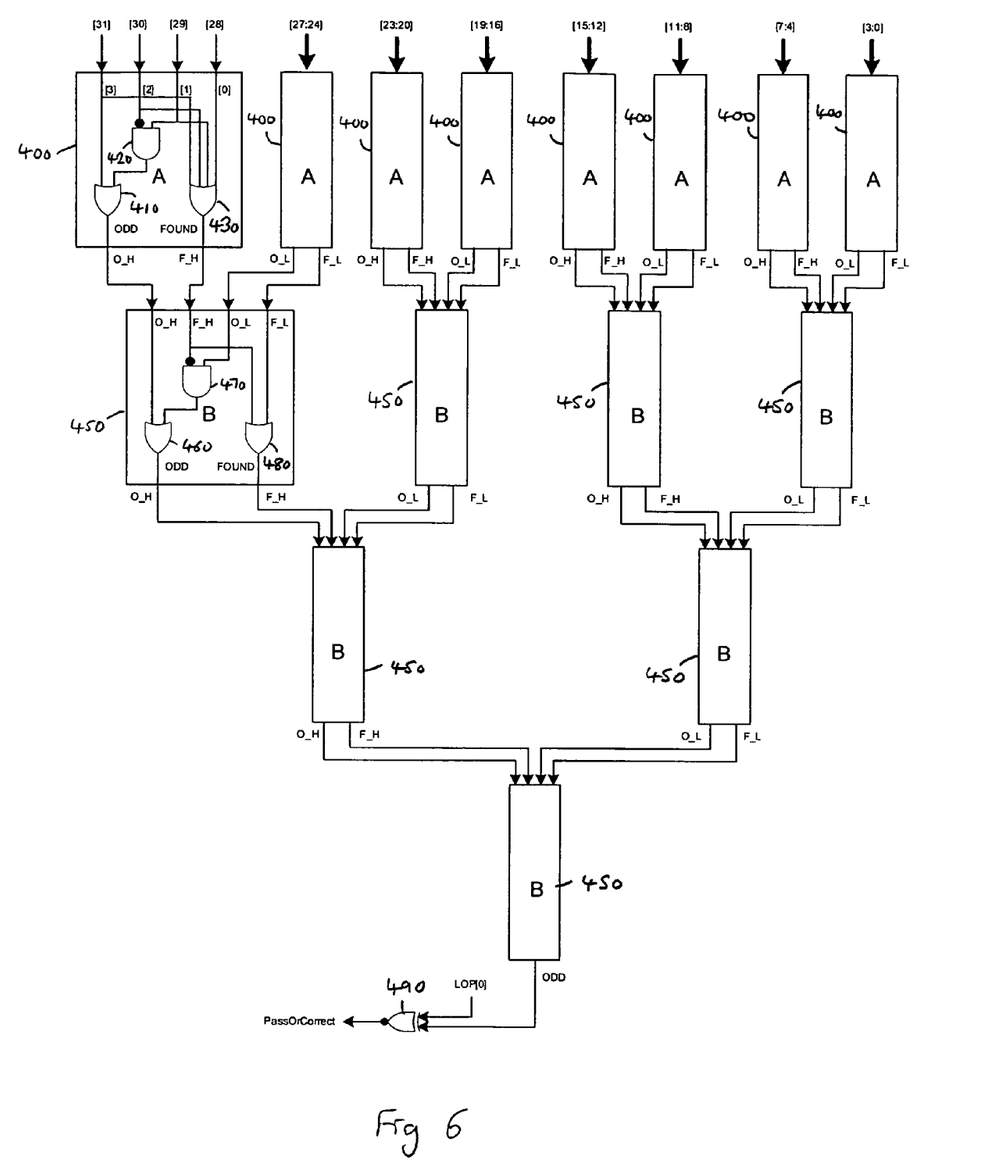
FIG. 6 is a diagram illustrating in more detail the correction logic of FIG. 5.

FIG. 6 is a diagram illustrating in more detail the correction logic 250 of FIG. 5. The logic blocks 400, 450 shown in FIG. 6 act as a priority encoder to evaluate the input 32-bit sum in order to determine whether the most significant logic one value is at an odd bit position when evaluated left to right. Each of the logic units 400 is identical, and as shown in FIG. 6 consists of an AND gate 420 and OR gates 410, 430. Each logic unit 400 receives four consecutive bits of the sum and the OR gate 430 will output a logic one value (i.e. a set output) if any of those four bits are set. Accordingly a set output from the OR gate 430 will indicate that the corresponding four-bit section of the sum includes a logic one value. In addition, the output from OR gate 410 will be set to a logic one value if the most significant of the four bits being evaluated is set to a logic one value, since this will indicate that the four-bit section of the sum being evaluated has a logic one value in an odd bit position. The purpose of the AND gate 420 is to also cause the output from the OR gate 410 to be set if a logic one value is present in the other odd bit position, provided that a logic one value is not also present in the more significant even bit position. Accordingly, considering the example of bits 31 to 28, the AND gate 420 will only produce a logic one output if bit 30 is zero (given the inverter at the corresponding input to the AND gate as indicated by the bubble on the input to be inverted) and bit 29 is one. This will then cause the OR gate 410 to output a set signal (i.e. a logic one signal indicating that the leading one in that four-bit section is at an odd bit position).

Hence, it can be seen that each block 400 produces an "ODD" signal which is set if the first logic one value found in the corresponding four-bit section of the sum is at an odd bit position, and a "FOUND" signal which is set if the four-bit section contains a logic one value. The two output signals from a pair of adjacent logic blocks 400 are then routed as inputs to a logic block 450. In FIG. 6, the symbols O_H and F_H denote "ODD high" and "FOUND high", and the symbols O_L and F_L denote "ODD low" and "FOUND low", and accordingly represent the ODD and FOUND signals produced by the high half and low half of the bits being considered by the logic block 450.

Each logic block 450 consists of two OR gates 460, 480 and an AND gate 470. The OR gate 480 will output a set "FOUND" signal if either the F_H or the F_L input signals are set, and hence will be set if any of the bits of the sum under consideration are a logic one value. For the first level of logic blocks 450, each logic block 450 will be considering an eight-bit section of the sum. The AND gate 470 serves to output a logic one value only if the F_H signal is not set and the O_L signal is set, i.e. detecting a situation where in the odd half of the data under consideration a leading one has been detected which is in an odd bit position, and in the high half no logic one value existed. The OR gate 460 will then output a logic one value if either the O_H signal is set or the output from AND gate 470 is set, and accordingly the output from the OR gate 460 will be set if the leading one in the portion of the sum under consideration is at an odd bit position.

This process is repeated as shown in FIG. 6 until a final "ODD" signal is output, which will only be set if the leading one identified in the entire 32-bit sum was determined to exist at an odd bit position. This "ODD" signal is then routed to a XNOR gate 490, which receives as its second input the least significant bit of the shift count stored in the register 230. Given the properties of the gate 490, it will be appreciated that a logic one value will be output if either the "ODD" signal is a logic zero value (indicating that the leading one is at an even bit position), and the least significant bit of the shift count is also a logic zero value (indicating an even shift), or if the ODD signal is set to a logic one value (indicating that the most significant one is at an odd bit position), and also the least significant bit of the shift count is set to a logic one value (indicating an odd shift). For either of these situations, this indicates that the predicted shift count was incorrect and will have produced a left shift which is one larger than required, and accordingly the logic one value can be used to cause the multiplexer 260 to select its left-hand input as the correct normalized result. For all other cases, the gate 490 will produce a logic zero value, which will cause the multiplexer 260 to select its right-hand output as the normalized result (i.e. this being the situation where the predicted shift count was correct).

Figure 7:
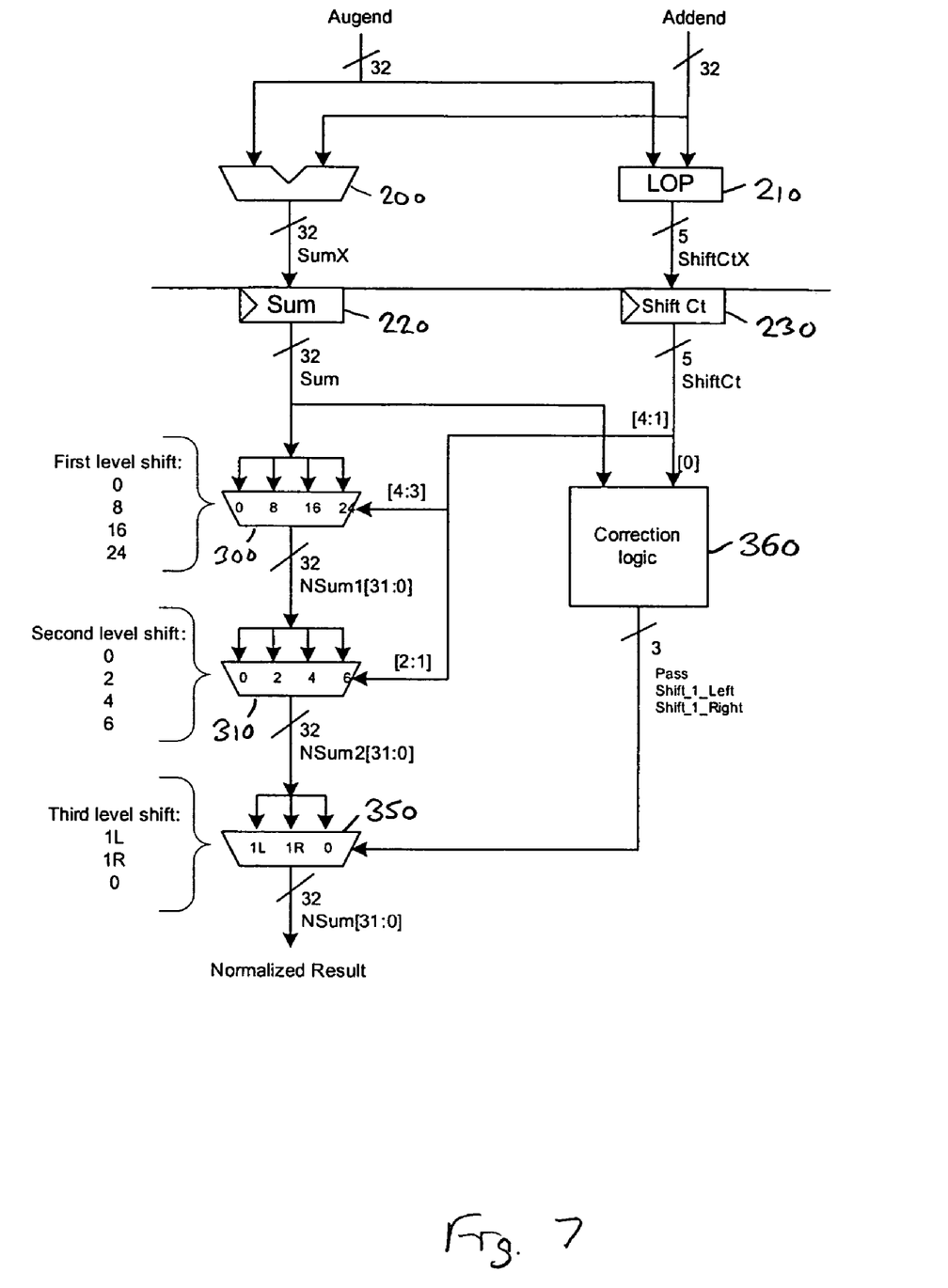
FIG. 7 is a block diagram illustrating in more detail the data processing apparatus of FIG. 4 in accordance with an alternative embodiment of the present invention.
Figure 8:
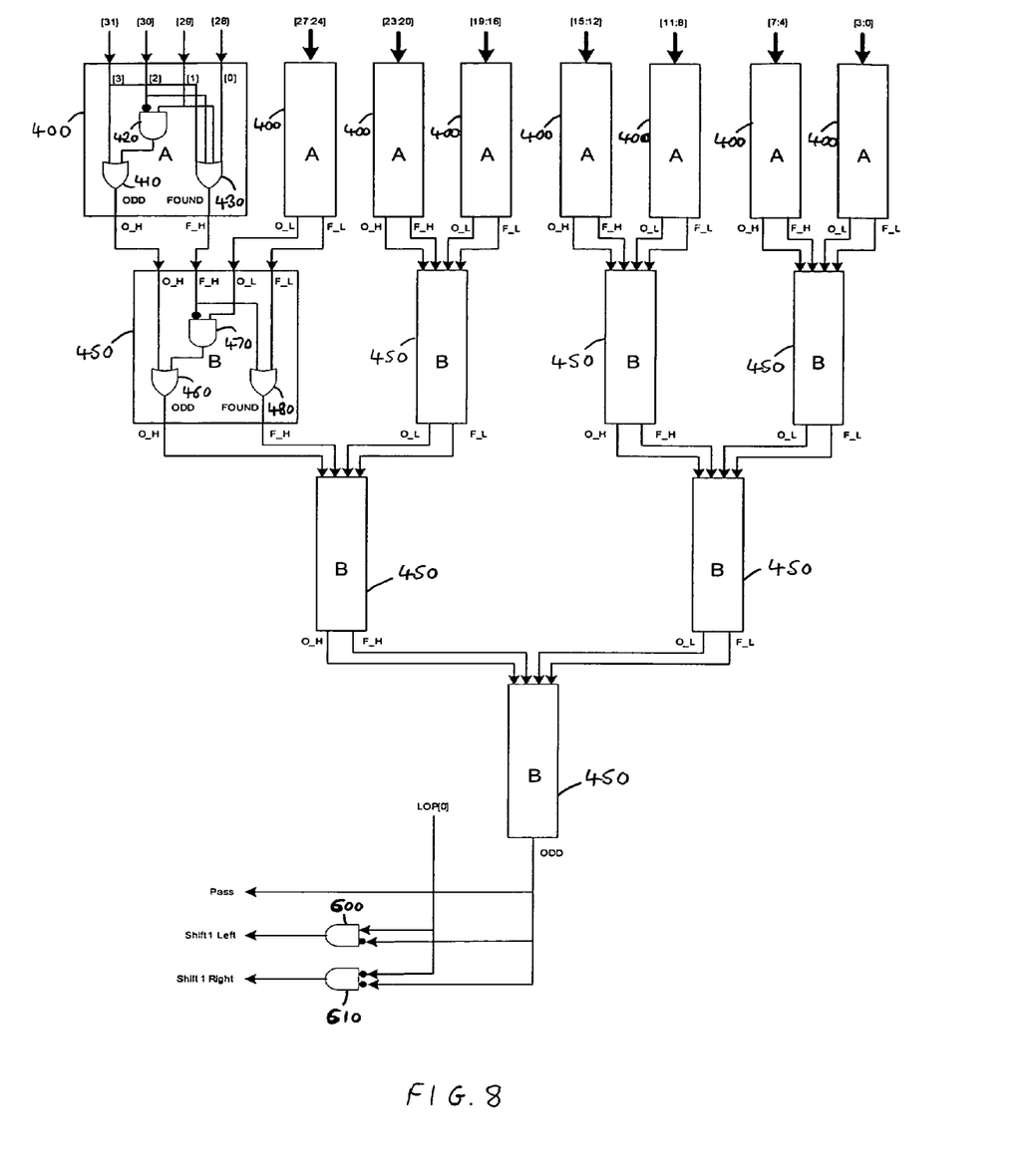
FIG. 8 is a diagram illustrating in more detail the correction logic of FIG. 7.

FIG. 7 illustrates an alternative embodiment for the data processing apparatus in which the final correction multiplexer 260 is incorporated within the normalization shift logic 240. In particular, as will be apparent from a comparison of FIGS. 5 and 7, the two multiplexers 320 and 260 in FIG. 5 are replaced by a single multiplexer 350, which is able to perform either a one bit left shift, a one bit right shift, or no shift, dependent on a three-bit control signal received from the correction logic 360. In this example, the correction logic may be constructed as shown in FIG. 8. As shown in FIG. 8, the same logic blocks 400, 450 are used to generate an "ODD" signal which will be set if the most significant one in the sum is at an odd bit position. However, the final XNOR gate 490 of FIG. 6 is replaced by a sequence of AND gates 600, 610. The AND gate 600 receives the least significant bit of the shift count, and an inverted version of the ODD signal, such that it will only produce a logic one output if the least significant bit of the shift count is one (indicating an odd shift), and the ODD signal is at a logic zero level (indicating that the most significant bit of the sum is at an even bit position). When the output for the AND gate 600 is set, this will cause the final multiplexer 350 to select its left-hand input, implementing an effective one bit left shift.

The AND gate 610 receives the inverted least significant bit of the shift count, and the inverted ODD signal, and hence will produce a logic one value only if the least significant bit of the shift count is zero and the ODD signal is zero, this being the situation where the predicted shift count is an even shift count and the most significant one in the sum value is at an even bit position. If the output from the AND gate 610 is set at a logic one level, this will cause the multiplexer 350 to select its middle input, implementing an effective one-bit right shift.

As also shown in FIG. 8, if the ODD signal is set, this will directly drive a set "Pass" signal to the multiplexer 350 to cause its right-hand side input to be selected, implementing no shift.

It will be appreciated that for any particular combination of least significant bit of shift count value and ODD signal value, only one of the Pass, shift one right and shift one left signals can be set. The end result of the correction logic illustrated in FIG. 8, in combination with the single multiplexer 350 shown in FIG. 7, is that the final multiplexer 350 in a combinatorial way implements any required left shift dictated by the least significant bit of the shift count, in combination with any required corrective right shift resulting from a determination by the correction logic that the predicted shift count is incorrect.

Table 1 below is provided to illustrate the principle behind the analysis performed by the correction logic of embodiments of the present invention:

TABLE 1

| Sum[31:0] | | | | | | | | | | Odd | Correct | | Incorrect | |
|---|---|---|---|---|---|---|---|---|---|---|---|---|---|---|
| 31 | 30 | 29 | 28 | 27 | 26 | ... | 1 | 0 | | | Amt | [0] | Amt | [0] |
| 0 | 1 | x | x | x | x | | x | x | | N | 1 | 1 | 2 | 0 |
| 0 | 0 | 1 | x | x | x | | x | x | | Y | 2 | 0 | 3 | 1 |
| 0 | 0 | 0 | 1 | x | x | | x | x | | N | 3 | 1 | 4 | 0 |
| 0 | 0 | 0 | 0 | 1 | x | | x | x | | Y | 4 | 0 | 5 | 1 |
| 0 | 0 | 0 | 0 | 0 | 1 | | x | x | | N | 5 | 1 | 6 | 0 |
| 0 | 0 | 0 | 0 | 0 | 0 | | 1 | x | | Y | 30 | 0 | 31 | 1 |
| 0 | 0 | 0 | 0 | 0 | 0 | | 0 | 1 | | N | 31 | 1 | 32 | 0 |

The leading 1 is identified in the Sum vector of Table 1, and the Odd term, correct shift count (Amt) and associated bit 0 of the shift count ([0]), and the incorrect shift count and associated bit 0 of the shift count are given in Table 1.

Assuming use of the embodiment of FIGS. 7 and 8, and taking as an example a sum value where bit [31]=0, bit [30]=0, bit [29]=0, and bit [28]=1, the location of the first 1 is identified as being even, i.e. the 'ODD' signal is not set. To shift this bit into bit position 31, a shift count of 3 is required. For a shift count of 3, bit 0 of the shift count is 1. Hence, if the predicted shift count was correct, the AND gate 600 will output a logic 1 value, thereby causing the multiplexer 350 to implement a one bit left shift. This is the standard one bit left shift required by bit 0 of the shift count value.

If in contrast the determination of the shift count was in error, the shift count would be 4, and bit 0 would be set to 0. Hence, for the incorrect case, the ODD signal is again not set, but bit 0 of the shift count is 0, and this will cause the AND gate 610 to output a logic 1 value, thereby causing the multiplexer 350 to implement a one bit right shift, signalling that the shift was excessive by one place, and needs correcting.

As mentioned earlier, in single-precision floating point systems, it is common to process 32-bit integers for conversion to and from floating point values. This may be done in the same pipeline as that which processes additions which may require normalization. When an input integer is negative, or a floating point value to be converted to an integer is negative, it is first inverted and the adder in the first stage is used as an incrementer to generate the two's complement of the input. As in an addition operation, the predicted location of the most significant logic one value may be off by at most one bit for the two's complement operation, and accordingly the above-described operation of the correction logic can also serve to correct an incorrect prediction of the leading one when performing such conversion operations.

Considering the embodiment shown in FIGS. 7 and 8, the delay for the correction logic 360 is less than the delay through the first two multiplexers 300, 310, resulting in an overall additional delay equivalent to the difference between the delay through a two input multiplexer and the delay through a three input multiplexer. In many technologies this difference is negligible, resulting in a correction circuit which executes nearly completely in parallel with the normalizer logic. Hence, a significant timing improvement is realised when compared with the earlier described prior art of FIG. 1. The embodiment shown in FIGS. 5 and 6 also achieves significant timing improvements, by enabling the multiplexer 260 to be controlled by the output of the correction logic 250. Further, the correction logic 250, 360 of both embodiments is relatively simple to implement and requires no modification to the adder logic 200 or the leading one prediction logic 210, thereby providing a particularly efficient implementation.

The correction logic 250, 360 described above may be easily applied to data paths of other sizes, such as 24 bits for single precision floating point values, or 53 bits for double precision floating point values, or indeed to data paths with the capability to operate on multiple data widths, such as all of the three widths mentioned above. Further, although the priority encoding logic illustrated in FIGS. 6 and 8 produces a determination of oddness, it will also be appreciated that it could be arranged to perform a determination of evenness, and it will be appreciated that other structures could be provided to perform the detection of oddness or evenness, other than the particular structure shown in FIGS. 6 and 8. Further, it will be appreciated that structures other than those shown in FIGS. 6 and 8 could be used to produce the required control signals for the correction multiplexer, and indeed other muxing arrangements could be provided in alternative embodiments to bring about the same effective shift patterns.

If the prior art circuitry of FIG. 1 were to be used, the final correction multiplexer 60, due to its dependence on the output of the normalization shift logic, may be pushed into the next cycle, and this cycle commonly is used to multiplex between the outputs of several blocks, including the far path addition block, with the output required to drive a significant distance to forwarding multiplexers and the register file. As the delay component in a cycle due to wire delay has increased in prior generations, this state is less likely to have the additional delay capability to support multiplexer 60. However, by employing techniques of embodiments of the present invention, the function of the multiplexer 60 can be retained in the stage with the normalizer logic, and hence does not increase the delay in the subsequent stage.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus for normalizing a data value to produce a result value, comprising:
   prediction logic circuitry configured to generate a shift indication based on a prediction of the number of bit positions by which the data value needs to be shifted in order to normalize the data value;
   normalizer logic circuitry configured to apply a shift operation to the data value based on the shift indication;
   correction logic circuitry configured to operate in parallel with the normalizer logic circuitry and to determine from the data value and a least significant bit of the shift indication whether the shift indication has correctly predicted the number of bit positions by which the data value needs to be shifted in order to normalize the data value, or whether instead the prediction is incorrect, and to generate an output signal dependent on that determination; and
   shift logic circuitry configured, if the output signal indicates that the prediction is incorrect, to apply a correction shift such that the result value is the normalized data value, wherein the correction logic circuitry is configured to determine from the data value whether the leading one in that data value is at an even bit position or an odd bit position, and then to determine with reference to the least significant bit of the shift indication whether application of the shift operation based solely on the shift indication will cause the data value to be normalized.

2. A data processing apparatus as claimed in claim 1, wherein the shift logic circuitry is incorporated within the normalizer logic circuitry.

3. A data processing apparatus as claimed in claim 2, wherein the normalizer logic circuitry comprises a sequence of shifter stages, and the shift logic circuitry is incorporated within a final shifter stage of the normalizer logic circuitry.

4. A data processing apparatus as claimed in claim 2, wherein the correction logic circuitry further comprises output signal generation logic circuitry which, when generating the output signal dependent on the determination as to whether the prediction is correct or incorrect, also takes into account any normal shift required to be performed by the normalizer logic circuitry based on the least significant bit of the shift indication.

5. A data processing apparatus as claimed in claim 1, wherein if the leading one of the data value is at an even bit position, and the least significant bit of the shift indication is 0, then the correction logic circuitry determines that application of the shift operation based solely on the shift indication will not cause the data value to be normalized, and accordingly the output signal indicates that the prediction is incorrect.

6. A data processing apparatus as claimed in claim 1, wherein if the leading one of the data value is at an odd bit position, and the least significant bit of the shift indication is 1, then the correction logic circuitry determines that application of the shift operation based solely on the shift indication will not cause the data value to be normalized, and accordingly the output signal indicates that the prediction is incorrect.

7. A data processing apparatus as claimed in claim 1, wherein the correction shift is a one bit right shift.

8. A data processing apparatus as claimed in claim 1, wherein the data value is a significand of a floating point data value, further comprising:
   data processing logic circuitry configured to generate the significand from one or more input operands;
   the prediction logic circuitry configured to generate the shift indication based on an evaluation of the one or more input operands.

9. A data processing apparatus as claimed in claim 8, wherein the data processing logic circuitry is configured to perform an unlike signed addition of first and second input operands.

10. A method of operating a data processing apparatus to normalize a data value to produce a result value, comprising the steps of:
   (i) generating a shift indication based on a prediction of the number of bit positions by which the data value needs to be shifted in order to normalize the data value;
   (ii) applying a shift operation to the data value based on the shift indication;
   (iii) in parallel with said step (ii), determining from the data value and a least significant bit of the shift indication whether the shift indication has correctly predicted the number of bit positions by which the data value needs to be shifted in order to normalize the data value, or whether instead the prediction is incorrect, and generating an output signal dependent on that determination; and
   (iv) if the output signal indicates that the prediction is incorrect, applying a correction shift such that the result value is the normalized data value, wherein during said determining step (iii), it is determined from the data value whether the leading one in that data value is at an even bit position or an odd bit position, and then determined with reference to the least significant bit of the shift indication whether application of the shift operation based solely on the shift indication will cause the data value to be normalized.

* * * * *